United States Patent
Heath

(10) Patent No.: US 10,272,630 B2
(45) Date of Patent: Apr. 30, 2019

(54) APPARATUS FOR MAKING PREFORMED SEALS

(71) Applicant: The Boeing Company, Chicago, IL (US)

(72) Inventor: Jonathan Christopher Heath, Charleston, SC (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 15/092,727

(22) Filed: Apr. 7, 2016

(65) Prior Publication Data

US 2016/0221289 A1    Aug. 4, 2016

Related U.S. Application Data

(62) Division of application No. 14/189,062, filed on Feb. 25, 2014, now Pat. No. 9,308,702.

(51) Int. Cl.
   *B29D 99/00*    (2010.01)
   *B29C 45/37*    (2006.01)
   (Continued)

(52) U.S. Cl.
   CPC .......... *B29D 99/0053* (2013.01); *B29C 31/04* (2013.01); *B29C 33/0055* (2013.01);
   (Continued)

(58) Field of Classification Search
   CPC ........ B29C 39/24; B29C 33/60; B29C 45/37; B29C 45/26; B29C 33/0055;
   (Continued)

(56) References Cited

U.S. PATENT DOCUMENTS 3,995,981 A * 12/1976 Fries ................... B29C 33/0061
                                                     264/DIG. 83
5,089,201 A    2/1992 Takahashi
(Continued)

FOREIGN PATENT DOCUMENTS

JP    2002192571 A    7/2002

OTHER PUBLICATIONS

EPO Extended Search Report for related application 15153232.2 dated Jul. 24, 2015; 4 pp.
(Continued)

*Primary Examiner* — Nahida Sultana
(74) *Attorney, Agent, or Firm* — Armstrong Teasdale LLP

(57) ABSTRACT

A method of making a preformed seal includes coupling first and second sections of a mold to define a mold cavity. A cross-sectional shape of the mold cavity corresponds to a cross-sectional shape of the preformed seal. The method also includes providing a reservoir that has a port in flow communication with a reservoir cavity that extends to a parting surface. The method further includes filling the reservoir cavity with wet sealant such that the wet sealant is flush with the parting surface and a bead of wet sealant protrudes from the port. Additionally, the method includes coupling the reservoir to the first and second sections such that the reservoir cavity is in flow communication with the mold cavity at the parting surface, injecting wet sealant from a nozzle through the reservoir into the mold cavity, and curing the wet sealant in the mold cavity to make the preformed seal.

16 Claims, 15 Drawing Sheets

(51) Int. Cl.
*B29C 33/00* (2006.01)
*B29C 33/60* (2006.01)
*B29C 31/04* (2006.01)
*B29C 39/24* (2006.01)
*B29C 45/00* (2006.01)
*B29C 45/03* (2006.01)
*B29C 45/26* (2006.01)
*F16J 15/02* (2006.01)
*F16J 15/04* (2006.01)
*B29L 31/26* (2006.01)

(52) U.S. Cl.
CPC .............. *B29C 33/60* (2013.01); *B29C 39/24* (2013.01); *B29C 45/0046* (2013.01); *B29C 45/03* (2013.01); *B29C 45/26* (2013.01); *B29C 45/37* (2013.01); *F16J 15/022* (2013.01); *F16J 15/04* (2013.01); *B29L 2031/26* (2013.01)

(58) Field of Classification Search
CPC ..... B29C 45/0046; B29C 45/03; B29C 31/04; B29D 99/0053; F16J 15/04; F16J 15/022; B29L 2031/26
See application file for complete search history.

(56) References Cited

U.S. PATENT DOCUMENTS

| | | | |
|---|---|---|---|
| 5,964,979 A | 10/1999 | George et al. | |
| 6,855,286 B2 | 2/2005 | Osawa et al. | |
| 8,123,995 B2 | 2/2012 | Tamura | |
| 8,616,868 B2 | 12/2013 | Hutter, III et al. | |
| 2006/0065998 A1* | 3/2006 | Takigawa | B29C 33/444 264/132 |
| 2008/0029914 A1 | 2/2008 | Hamanaka et al. | |
| 2012/0018927 A1* | 1/2012 | Watanabe | B29C 45/2669 264/500 |
| 2012/0133079 A1 | 5/2012 | Sykes et al. | |
| 2012/0213884 A1* | 8/2012 | Judd | B29C 33/565 425/567 |
| 2013/0043619 A1* | 2/2013 | Kohn | B29C 45/0055 264/266 |
| 2013/0071725 A1* | 3/2013 | Hougron | H01M 2/0212 429/163 |
| 2015/0321403 A1* | 11/2015 | Kameyama | B29C 33/02 264/41 |
| 2016/0054593 A1* | 2/2016 | Flitsch | G02C 11/10 351/158 |
| 2016/0136859 A1* | 5/2016 | Song | B29C 45/14819 411/82.1 |
| 2017/0100868 A1* | 4/2017 | Tan | B29C 45/72 |
| 2017/0197345 A1* | 7/2017 | Okamoto | B29C 44/1219 |
| 2018/0257282 A1* | 9/2018 | Neerincx | B29C 45/14 |

OTHER PUBLICATIONS

Product Information for Aircraft Seals, JACO Aerospace available at http://web.archive.org/web/20140106234225/http://www.e-aircraftsupply.com/aircraft_products/file/aircraft-seals.aspx; last visited Apr. 5, 2016; 1 page.

* cited by examiner

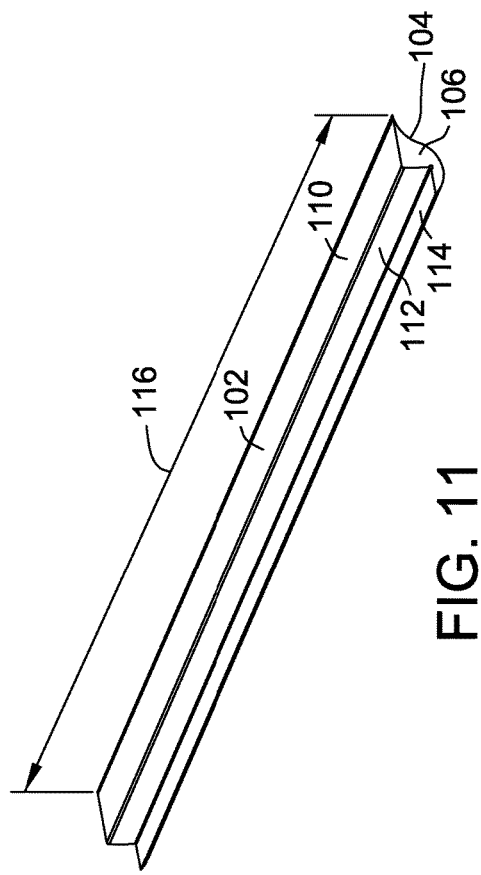
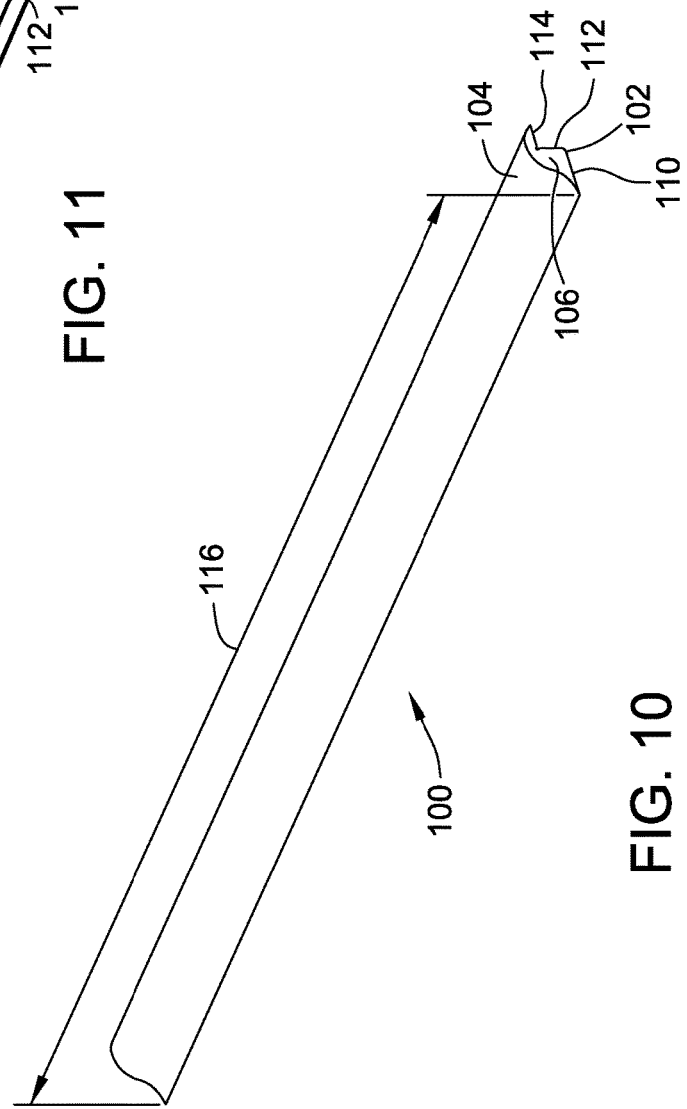
FIG. 11
FIG. 10

APPARATUS FOR MAKING PREFORMED SEALS

CROSS REFERENCE TO RELATED APPLICATIONS

This application is a divisional and claims priority to U.S. patent application Ser. No. 14/189,062 filed Feb. 25, 2014, and issued as U.S. Pat. No. 9,308,702 on Apr. 12, 2016, for "METHOD AND APPARATUS FOR MAKING PRE-FORMED SEALS", which is hereby incorporated by reference in its entirety.

BACKGROUND

The field of the disclosure relates generally to sealing surface discontinuities, and, more particularly, to seals for encapsulating gaps, edges, ledges, and other discontinuities on an aircraft structure.

Many structures, such as aircraft structures, include a plurality of assemblies that may create gaps, edges, ledges, and other discontinuities where elements of the assemblies interface. Efficient and safe operation of an aircraft, for example, requires that such discontinuities be sealed. Traditionally, such discontinuities are sealed by the direct application of wet sealant using a manually operated extrusion device and hand tools. However, such direct application of wet sealant poses several difficulties. Typically, other work must be delayed for 48 to 72 hours near the area of the structure to which wet sealant has been applied, to enable the wet sealant to cure sufficiently to avoid contamination or damage impacts from other work. Moreover, in some circumstances, air may become entrained as the wet sealant is applied, or the manual application of wet sealant may involve short pauses and restarts, each of which tends to create bubbles and voids within the applied sealant. Furthermore, it may be necessary to apply successive layers, or "beads," of wet sealant in a stacked fashion to achieve the desired thickness of the seal, and voids tend to occur between each layer.

In addition, the quality of application of the wet sealant may be sensitive to temperature. Wet sealant material that is colder than an optimal temperature tends to be too thick, and thus may not flow sufficiently to cover the discontinuity as intended. On the other hand, wet sealant material that is hotter than the optimal temperature may partially cure during application, sometimes referred to as "cross-linking" of the wet sealant. Cross-linking in the wet sealant also limits the ability of the sealant to flow smoothly to cover the discontinuity as intended, and to be worked with hand tools into a desired configuration immediately after application. In each case, streams or strands of sealant may separate and re-enter the seal region, trapping air inside and/or failing to integrate fully with the seal. Often it may be difficult to precisely control the temperature of the wet sealant throughout an application.

Seal regions that have an undesirable number of bubbles and voids must be reworked, and typically the rework may be performed only after the originally applied sealant has cured for 48 to 72 hours, for the reasons described above. Furthermore, the reworked portions of the seal typically must be allowed to cure for an additional 24 to 48 hours. In addition, pieces of re-entrant sealant may chip off during rework, creating a risk of foreign object debris for the rework.

Moreover, in some circumstances, an excess of wet sealant is applied to ensure an acceptable performance of the seal. Such excess sealant can add significant unnecessary weight to a structure such as an aircraft, adversely affecting the efficiency of operation. In addition, direct application of wet sealant can create irregular outer edges of the seal that are visually unappealing to customers. Thus, in some circumstances, direct application of wet sealant to structural discontinuities causes extended delays and increased expense in both manufacture and operation. The individuals who manually apply the wet sealant may need extended training and years of experience in order to successfully avoid the drawbacks described.

Some known seals use a cap or mold to control application of wet sealant directly to a structure, such as an aircraft. However, in at least some cases, the use of such a cap or mold does not prevent the entrainment of air during application of the wet sealant. In addition, the use of a cap or mold at the structure does not avoid the need to delay other work to enable the wet sealant to cure sufficiently to avoid contamination or damage impacts.

Some known seals are molded or extruded into a desired shape prior to installation on a structure, such as an aircraft. However, at least some known molding and extruding techniques also create defects in the seal. For example, during the injection of wet sealant into at least some known molds, the viscous wet sealant flowing against the interior surfaces of the mold tends to stack up on itself, producing folds along the edges of the seal. In addition, during extrusion of wet sealant through at least some known extrusion dies, the viscous sealant material tends to curl back toward the edges of the extrusion die, which deforms the intended cross-sectional shape of the seal.

BRIEF DESCRIPTION

In one aspect, a method of making a preformed seal is provided. The method includes coupling a first section of a mold to a second section of the mold such that a mold cavity is defined. A cross-sectional shape of the mold cavity corresponds to a cross-sectional shape of the preformed seal. The method also includes providing a reservoir that has a port in flow communication with a reservoir cavity. The reservoir cavity extends to a parting surface of the reservoir. The method further includes filling the reservoir cavity with wet sealant such that the wet sealant is flush with the parting surface, and a bead of wet sealant protrudes from the port. Additionally, the method includes coupling the reservoir to the first section and the second section such that the reservoir cavity is in flow communication with the mold cavity at the parting surface, injecting wet sealant from a nozzle through the reservoir into the mold cavity, and curing the wet sealant in the mold cavity to make the preformed seal.

In another aspect, a mold for making a preformed seal is provided. The mold includes a first section, and a second section configured to be removably coupled to the first section such that a mold cavity is defined between the first section and the second section. A cross-sectional shape of the mold cavity corresponds to a cross-sectional shape of the preformed seal. The mold also includes a reservoir that has a port in flow communication with a reservoir cavity. The reservoir cavity extends to a parting surface of the reservoir. The reservoir is configured to be removably coupled to the first section and the second section such that the reservoir cavity is in flow communication with the mold cavity at the parting surface. When the first section, the second section, and the reservoir are coupled together, the mold is configured to enable wet sealant injected through the port to extrude from the reservoir cavity into the mold cavity.

BRIEF DESCRIPTION OF THE DRAWINGS

FIG. 10 is a schematic diagram of a molded length of the preformed seal shown in FIG. 2;

FIG. 11 is another schematic diagram of a molded length of the preformed seal shown in FIG. 2;

DETAILED DESCRIPTION

The methods and apparatus described herein provide a preformed seal for gaps, edges, ledges, and other discontinuities in a surface of a structure, such as an aircraft. The methods and apparatus provide a seal with a desired predetermined cross-sectional shape, such as a shape that fits a fillet defined on the surface of the structure. The preformed seal includes a reduced number of voids, bubbles, and re-entrant strands, which reduces or eliminates a need for rework after the seal is applied to the structure. In addition, other work on the structure does not need to be delayed to allow the preformed seal to cure in place, and the preformed seal facilitates avoiding the use of excess sealant material.

Figure 1:
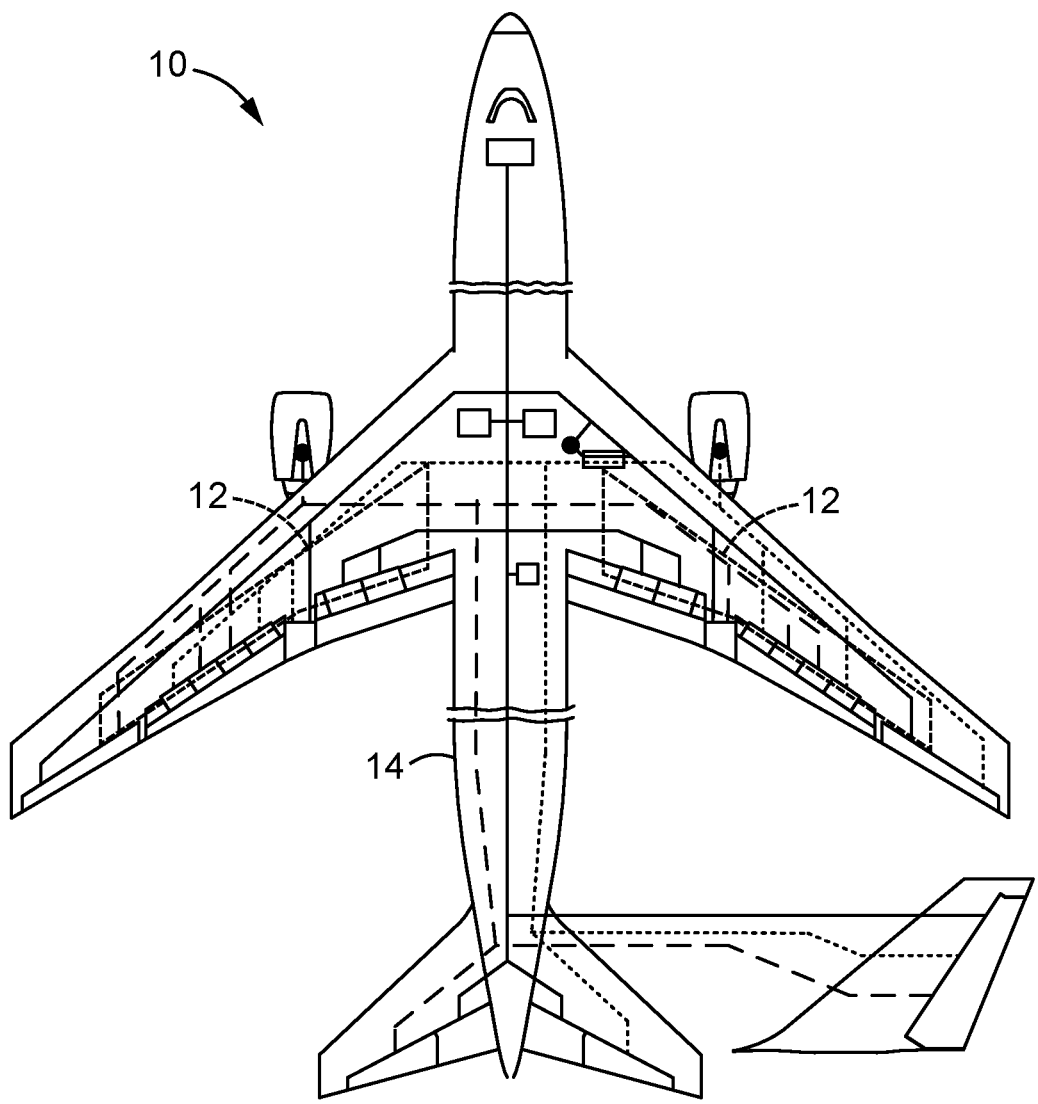
FIG. 1 is a schematic diagram of an example aircraft on which embodiments of a preformed seal may be used.

Referring more particularly to the drawings, implementations of the disclosure may be described in the context of a structure such as an aircraft 10 shown schematically in FIG. 1. Various components of aircraft 10, such as, but not limited to, fuel tanks 12 and fuselage 14, contain discontinuities on structural surfaces, such as exemplary discontinuity 50 shown in FIG. 2. In the embodiment shown in FIG. 2, discontinuity 50 is a fillet formed at a joint between a first structural member 52 and a second structural member 54. First structural member 52 and second structural member 54 may be, for example, overlapping panels of one of fuel tanks 12. A discontinuity surface 56 is defined by an outer surface 60 of first structural member 52, an edge surface 62 of second structural member 54, and an outer surface 64 of second structural member 54. It should be understood that embodiments of the disclosure are not limited to the shape of discontinuity 50, and the corresponding shape of preformed seal 100, illustrated in the exemplary embodiment.

Figure 2:
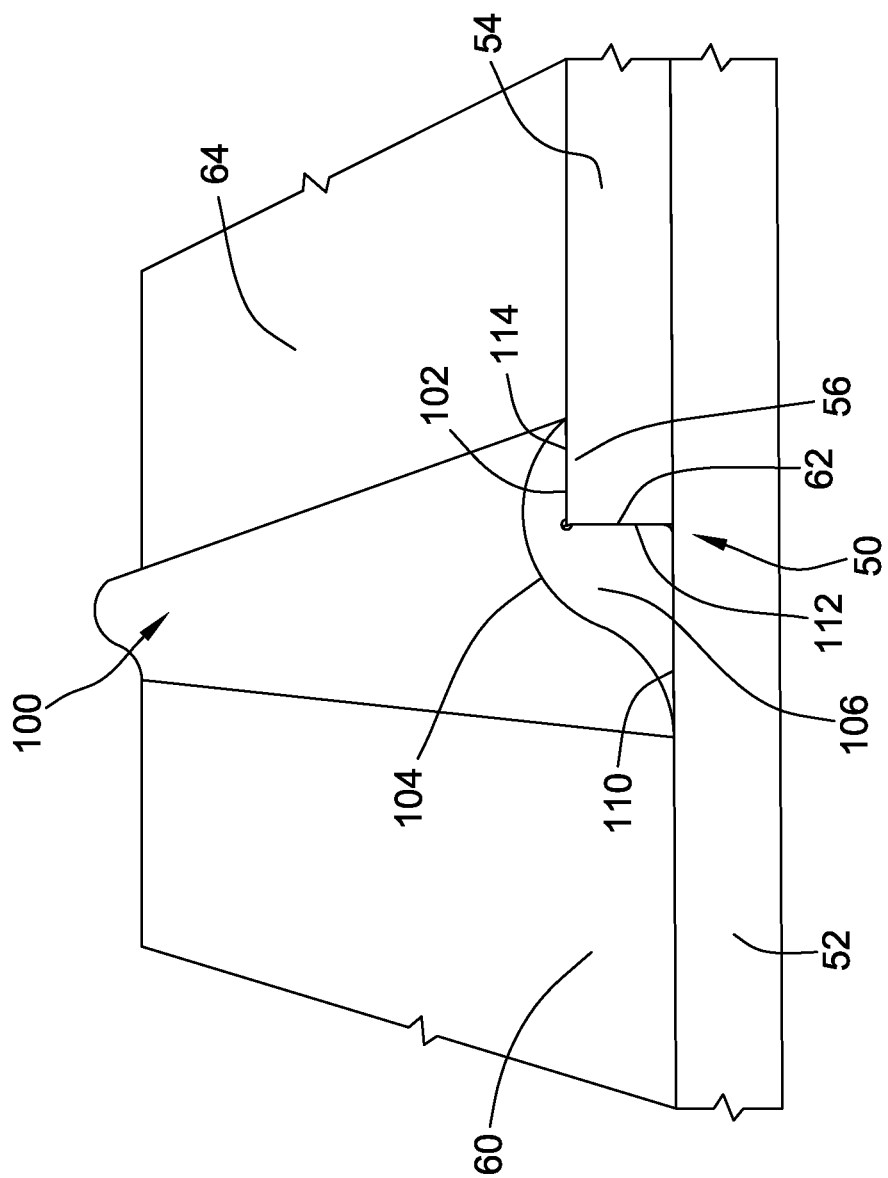
FIG. 2 is a schematic diagram of an embodiment of a preformed seal applied to an example structural discontinuity.

As illustrated schematically in FIG. 2, an exemplary preformed seal 100 is applied to discontinuity 50. Preformed seal 100 includes a contact surface 102 configured to be at least partially complementary to discontinuity surface 56, facilitating a seal against fluid flow between first structural member 52 and second structural member 54 when seal 100 is applied to discontinuity 50. In the embodiment shown in FIG. 2, contact surface 102 is defined by a first segment 110 configured to fit against outer surface 60 of first structural member 52, a second segment 112 configured to fit against edge surface 62 of second structural member 54, and a third segment 114 configured to fit against outer surface 64 of second structural member 54. Preformed seal 100 also includes a non-contact surface 104 and a cross-sectional shape 106 defined between contact surface 102 and non-contact surface 104.

In the exemplary embodiment, cross-sectional shape 106 is selected to satisfy at least one criterion with respect to seal 100. The at least one criterion may be, for example, a minimum thickness for seal 100 at discontinuity 50. The minimum thickness may be defined based on, for example, a minimum length of first segment 110, a minimum length of third segment 114, or any other suitable measure.

Figure 3:
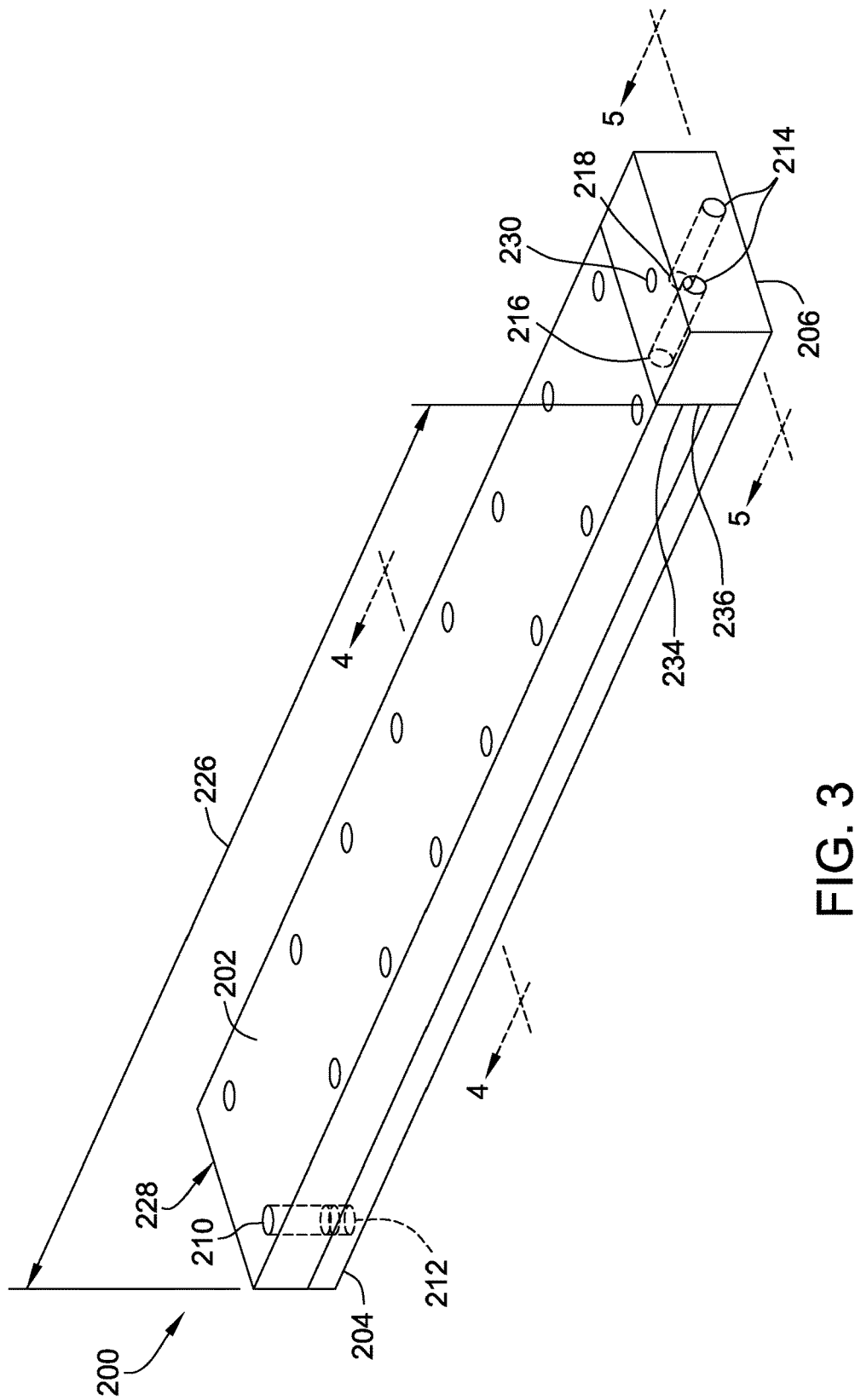
FIG. 3 is a schematic diagram of an embodiment of a mold configured for making the preformed seal shown in FIG. 2.
Figure 4:
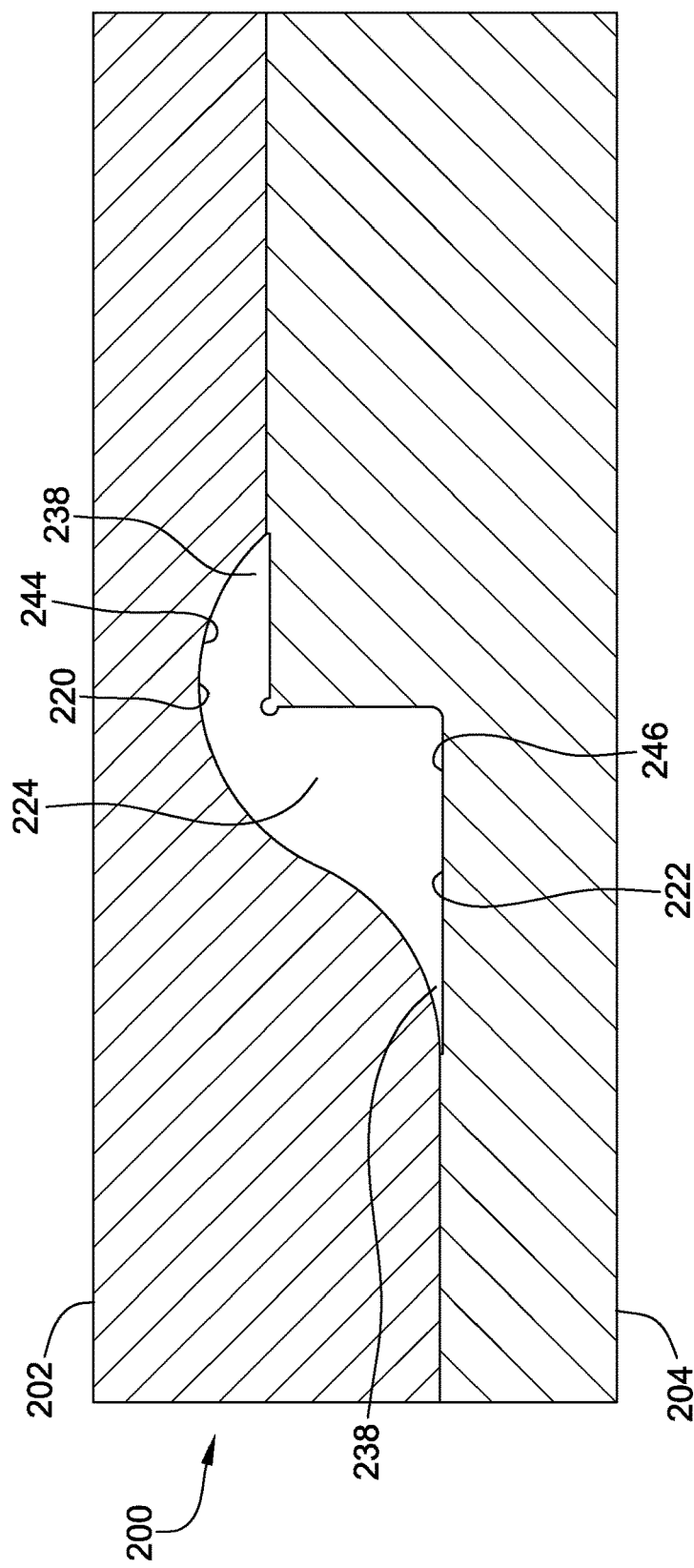
FIG. 4 is a cross-sectional view of the mold shown in FIG. 3.
Figure 5:
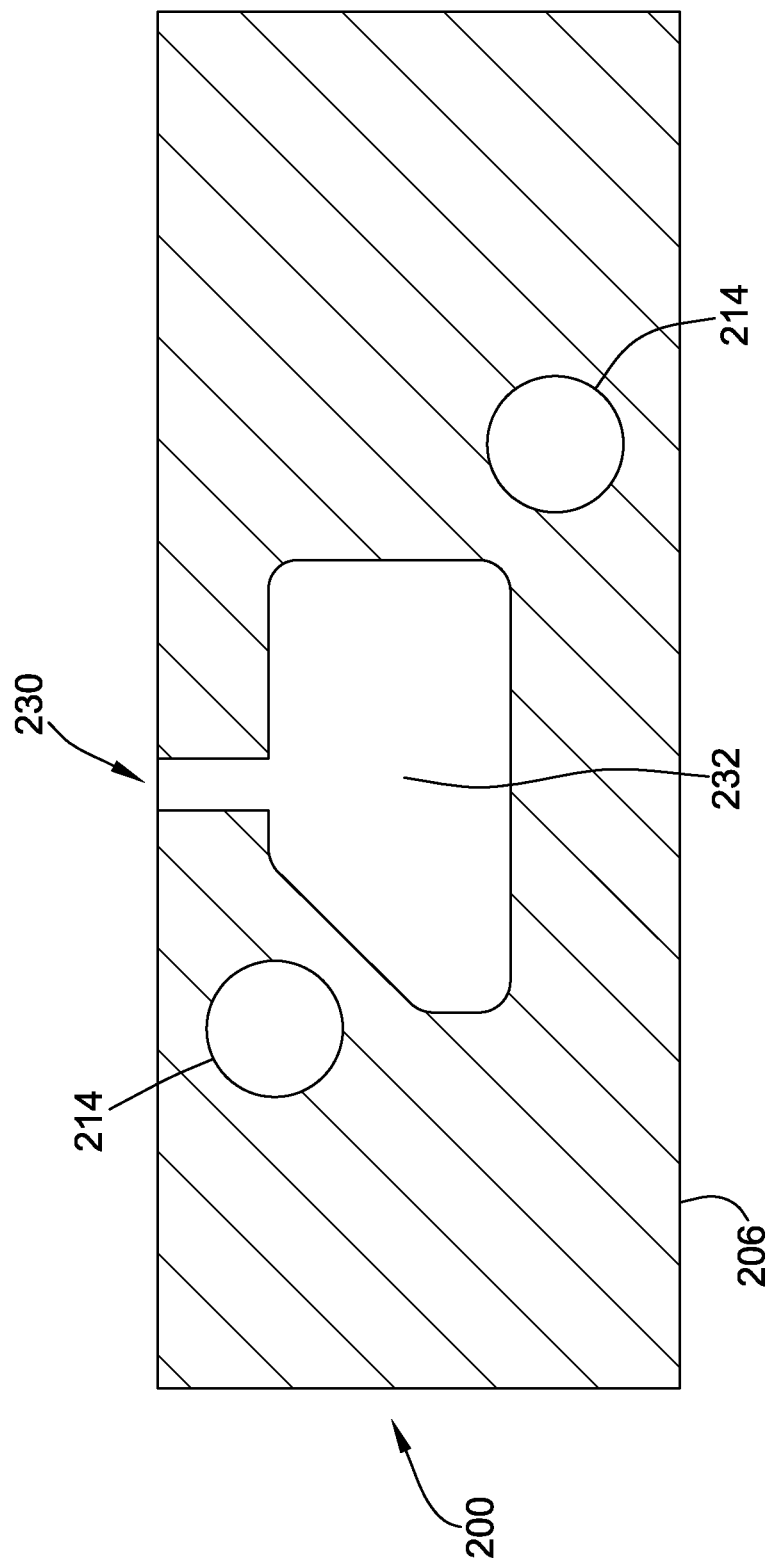
FIG. 5 is another cross-sectional view of the mold shown in FIG. 3.

An exemplary mold 200 for making preformed seal 100 is illustrated schematically in a perspective view in FIG. 3. A cross-section of exemplary mold 200 taken along line 4-4 is illustrated schematically in FIG. 4, and a cross-section of exemplary mold 200 taken along line 5-5 is illustrated schematically in FIG. 5. With reference to FIGS. 3-5, in the exemplary embodiment, mold 200 includes a first section 202, a second section 204, and a reservoir 206. First section 202 and second section 204 each include a plurality of cooperating bolt holes 210 and 212, respectively, one pair of which is illustrated by hidden lines in FIG. 3. Bolt holes 210 and 212 are configured to enable first section 202 and second section 204 to be removably coupled together. Similarly, reservoir 206 includes bolt holes 214, and first section 202 and second section 204 each include at least one bolt hole 216 and 218, respectively, that cooperates with a corresponding bolt hole 214. Bolt holes 214, 216, and 218 are configured to enable reservoir 206 to be removably coupled to an interface end 234 of first section 202 and second section 204. In alternative embodiments, first section 202, second section 204, and/or reservoir 206 may be removably coupled together in any other suitable fashion.

First section 202 includes a first molding surface 220, and second section 204 includes a second molding surface 222. First molding surface 220 is configured to be complementary to a first portion of the surface of preformed seal 100, and second molding surface 222 is configured to be complementary to a second portion of the surface preformed seal 100. In particular, first molding surface 220 is complementary to non-contact surface 104, and second molding surface 222 is complementary to contact surface 102. When first section 202 and second section 204 are coupled together, a mold cavity 224 is defined between first molding surface 220 and second molding surface 222 such that a cross-sectional shape of mold cavity 224 corresponds to cross-sectional shape 106 of preformed seal 100. In the exemplary embodiment, mold cavity 224 extends through interface end 234 of first section 202 and second section 204, along a length 226 of first section 202 and second section 204, and through a second end 228 opposite interface end 234. In alternative embodiments (not shown), mold cavity 224 terminates at a cap at second end 228 with an exhaust port defined therethrough.

Reservoir 206 includes a port 230 configured to allow wet sealant material (not shown) to be injected therethrough. Port 230 is in flow communication with a reservoir cavity 232 defined in reservoir 206. Reservoir cavity 232 extends to a parting surface 236 of reservoir 206. When reservoir 206 is coupled to first section 202 and second section 204, parting surface 236 is adjacent interface end 234 of first section 202 and second section 204, such that reservoir cavity 232 is in flow communication with mold cavity 224.

In the exemplary embodiment, reservoir cavity 232 has a cross-sectional size and shape configured to facilitate a smooth extrusion of wet sealant material therefrom into mold cavity 224. For example, although mold cavity 224 includes portions 238 defined by surfaces that meet at acute angles, as illustrated in FIG. 4, reservoir cavity 232 does not include any pair of surfaces that meet at an acute angle, as illustrated in FIG. 5. As another example, a plurality of surfaces that define reservoir cavity 232 includes at least one pair of surfaces that meets at an obtuse angle. Moreover, in the exemplary embodiment, a cross-sectional area of reservoir cavity 232 is substantially constant between port 230 and parting surface 236. Thus, reservoir cavity 232 is shaped to reduce a tendency of wet sealant material to stack up or curl in on itself, become trapped in narrow spaces, or curl outward when approaching, or exiting through, parting surface 236, while still providing a suitable area of flow communication with mold cavity 224. In alternative embodiments, reservoir cavity 232 may have any suitable shape that allows the use of mold 200 to make preformed seal 100 as described herein.

To make preformed seal 100 using mold 200, first molding surface 220 and second molding surface 222 are coated with a suitable release agent, and first section 202 and second section 204 are coupled together. An exemplary release agent includes, but is not limited to, is a dry lubricant such as a polytetrafluoroethylene-based release agent. Alternatively, when materials of the mold are sensitive to chemical application, the release agent is a layer of polytetrafluoroethylene tape applied to the mold. The wet sealant 240 to be used (shown in FIG. 6) is heated to a predetermined temperature. The predetermined temperature is in a range that facilitates smooth flow of wet sealant 240, yet does not induce heat-related cross-linking of wet sealant 240. As discussed in the Background section, a smooth flow is one that flows sufficiently to cover discontinuity 50 as intended. Advantageously, mold 200 may be used to make preformed seal 100 in a controlled environment, facilitating precise control of the temperature of wet sealant 240 relative to a typical application of wet sealant 240 directly to discontinuity 50. In certain embodiments, wet sealant 240 is PR-1776M B-2 sealant manufactured by PPG Aerospace, and the predetermined temperature is in a range from about 80 to about 90 degrees Fahrenheit. In an embodiment, the predetermined temperature is about 85 degrees Fahrenheit.

Figure 6:
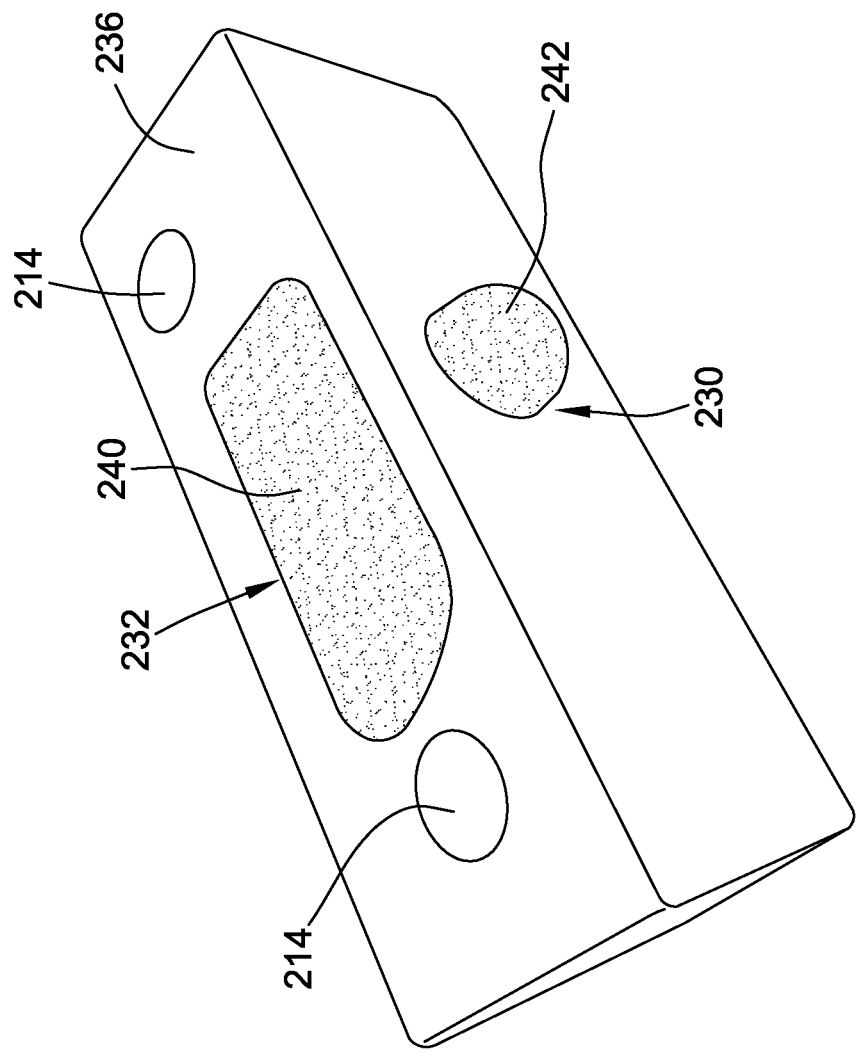
FIG. 6 is a perspective view of a reservoir section of the mold shown in FIG. 3.

As illustrated schematically in FIG. 6, reservoir 206 is positioned such that parting surface 236 faces upwards, and reservoir cavity 232 is filled with wet sealant 240 such that wet sealant 240 is flush with parting surface 236 and a bead 242 of wet sealant 240 protrudes from port 230. In the exemplary embodiment, filling reservoir cavity 232 with sealant 240 while reservoir 206 is uncoupled from first section 202 and second section 204 facilitates observation of, and prevention of, entrapment of air in wet sealant 240. Reservoir 206 is then coupled to first section 202 and second section 204. In alternative embodiments, reservoir is filled with wet sealant 240 after coupling to first section 202 and second section 204.

Figure 7:
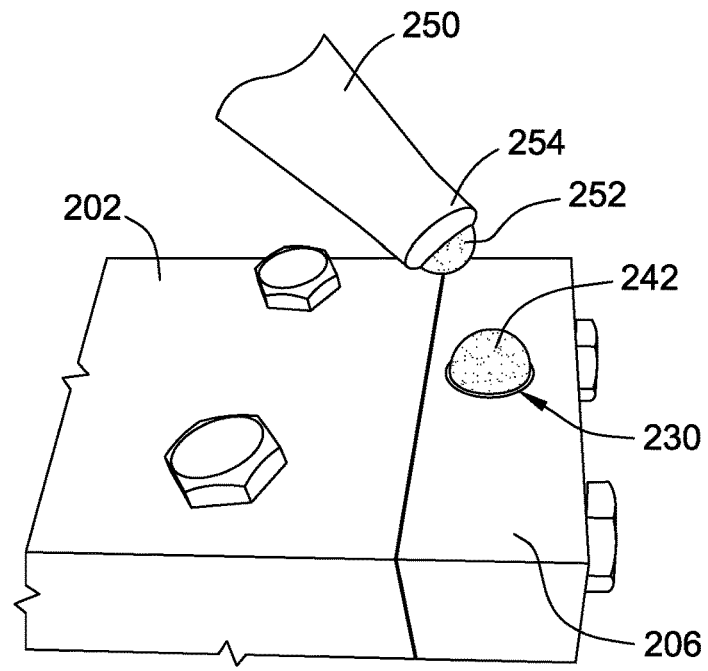
FIG. 7 is a perspective view of the mold shown in FIG. 3 prepared for sealant injection from a nozzle.
Figure 8:
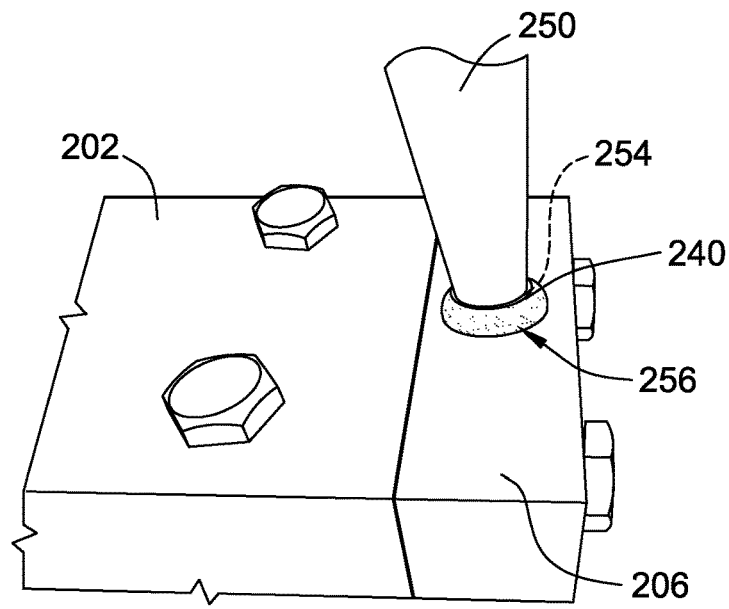
FIG. 8 is a perspective view of the mold shown in FIG. 3 during sealant injection from a nozzle.

As illustrated schematically in FIG. 7, after mold 200 is assembled and wet sealant bead 242 protrudes from port 230, mold cavity 224 is ready for wet sealant injection. A nozzle 250 for injecting wet sealant 240 is prepared such that a bead 252 of wet sealant 240 protrudes from a tip 254 of nozzle 250. As illustrated schematically in FIG. 8, nozzle tip 254 is then inserted into port 230. Nozzle wet sealant bead 252 and reservoir wet sealant bead 242 cooperate to reduce or prevent entrapment of air within wet sealant 240 as nozzle tip 254 is inserted into port 230. After insertion of nozzle tip 254, nozzle 250 injects wet sealant 240 into reservoir cavity 232. A collar 256 of wet sealant 240, initially formed by nozzle bead 252 contacting reservoir bead 242, surrounds nozzle tip 254 and continues to prevent entrapment of air during the injection process.

Figure 9:
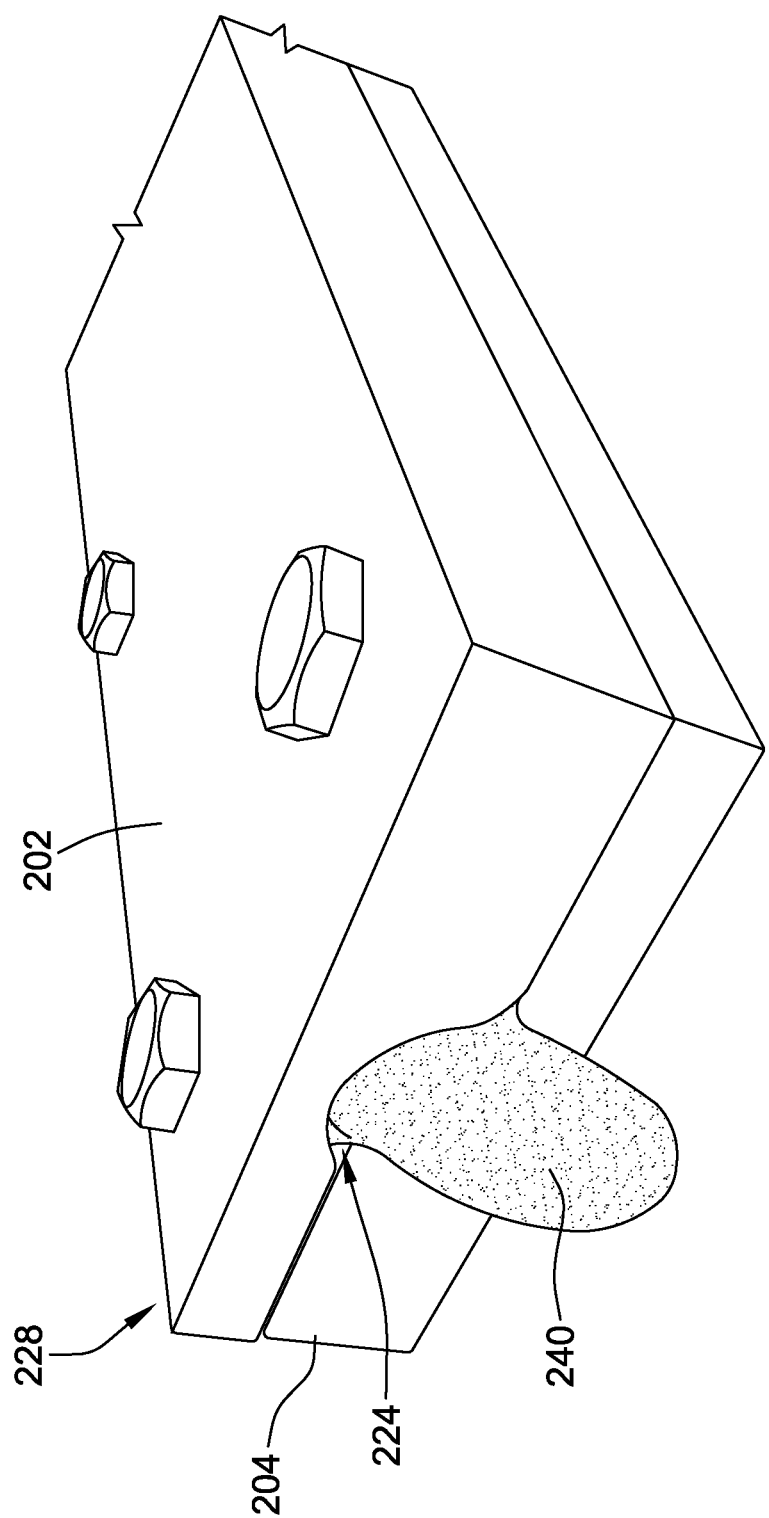
FIG. 9 is another perspective view of the mold shown in FIG. 3 during sealant injection from a nozzle.

In the exemplary embodiment, nozzle 250 injects wet sealant 240 at a pressure above atmospheric pressure. In certain embodiments, nozzle 250 injects wet sealant 240 at a pressure in a range of about 20 to about 40 psig. In an embodiment, nozzle 250 injects wet sealant 240 at a pressure of about 30 psig. In alternative embodiments, a pressure lower than 20 psig or higher than 40 psi is used to accommodate a viscosity of wet sealant 240, a surface characteristic of first molding surface 220 or second molding surface 222, and/or a material from which mold 200 is formed. The injection pressure causes wet sealant 240 to travel through reservoir cavity 232 and extrude through parting surface 236 of reservoir 206 into interface end 234 of mold cavity 224. Wet sealant 240 traverses mold cavity 224 along length 226 and exits mold cavity 224 at second end 228, as illustrated schematically in FIG. 9, indicating that mold cavity 224 is filled with wet sealant 240. When mold cavity 224 is filled with wet sealant 240, injection stops, and mold 200 remains assembled while wet sealant 240 cures. The portion of wet sealant 240 cured within mold cavity 224 forms preformed seal 100.

After a suitable curing time, first section 202, second section 204, and reservoir 206 are uncoupled, and preformed seal 100 is removed. In certain embodiments, the cure time is within a range of about 48 to about 72 hours. Cured sealant material formed outside mold cavity 224 is trimmed from preformed seal 100, and preformed seal 100 is cleaned with a suitable solvent to remove any remaining release agent. Two perspective schematic views of preformed seal 100 are shown in FIG. 10 and FIG. 11. Preformed seal 100 formed in this manner has a molded length 116 substantially equal to length 226 of mold first section 202 and second section 204.

In certain embodiments, at least one of first molding surface 220 and second molding surface 222 comprises a first portion 244 complementary to non-contact surface 104 of preformed seal 100. Moreover, at least one of first molding surface 220 and second molding surface 222 comprises a second portion 246 complementary to contact surface 102 of preformed seal 100. For example, in the exemplary embodiment shown in FIG. 4, first portion 244 is coextensive with first molding surface 220, and second portion 246 is coextensive with second molding surface 222. In certain embodiments, at least a portion of each of first portion 244 and second portion 246 is configured to impart desired properties to non-contact surface 104 and contact surface 102, respectively.

In particular, first portion 244 has a smooth surface such that non-contact surface 104, formed adjacent to first portion 244 in mold 200, has a relatively smooth finish that facilitates detection of defects in seal 100, is relatively less likely to trap foreign object debris, and offers a generally neat and pleasing appearance. In an embodiment, first portion 244 is configured such that non-contact surface 104 has a surface roughness of about 63 RMS ("root mean squared") or lower, as measured in accordance with ASME B46.1-2009. In contrast, second portion 246 has a rougher surface such that contact surface 102, formed adjacent to second portion 246 in mold 200, has a relatively rougher finish that facilitates better adhesive bonding of seal 100 to structural surfaces in the region of discontinuity 50, such as outer surface 60 of first structural member 52, edge surface 62 of second structural member 54, and outer surface 64 of second structural member 54 (shown in FIG. 2). In an embodiment, second portion 246 is configured such that contact surface 102 has a surface roughness in a range of about 125 RMS to 250 RMS, as measured in accordance with ASME B46.1-2009. In alternative embodiments, first molding surface 220 and second molding surface 222 each are configured to impart additional or other desired properties to non-contact surface 104 and contact surface 102.

Figure 12:
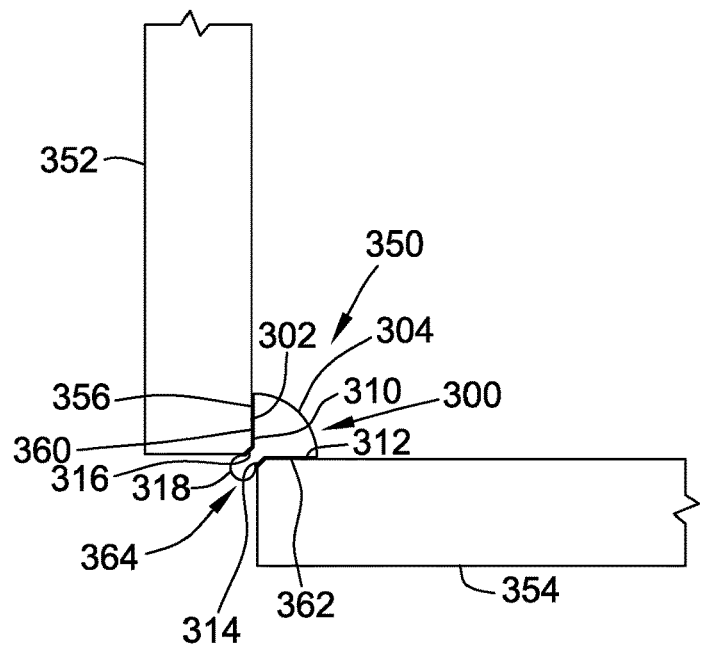
FIG. 12 is a schematic diagram of another embodiment of a preformed seal applied to another example structural discontinuity.
Figure 13:
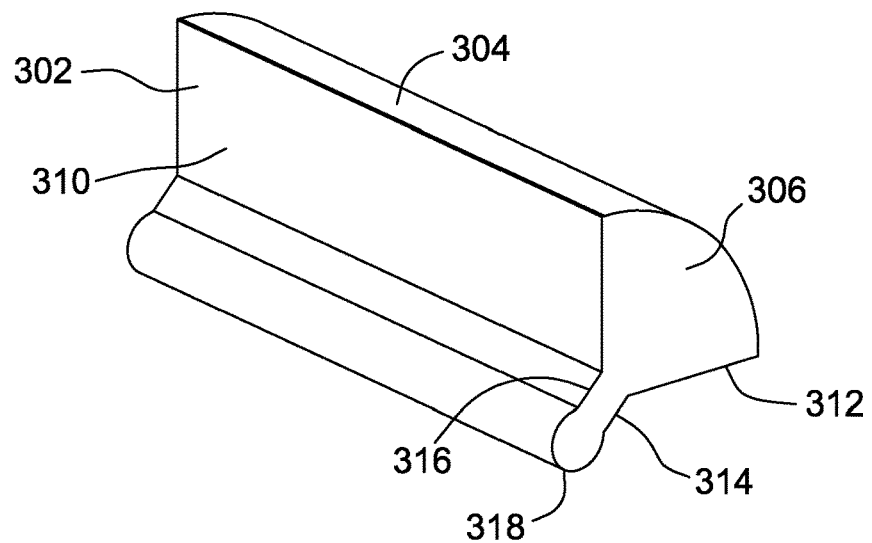
FIG. 13 is a schematic diagram of the preformed seal shown in FIG. 12.

Another exemplary embodiment of a preformed seal, designated as preformed seal 300, is illustrated schematically in FIG. 12 and FIG. 13. In the exemplary embodiment, a discontinuity 350 is located where a first panel 352 perpendicularly abuts a second panel 354. For example, discontinuity 350 may be present in a stowage bin area in a passenger cabin of aircraft 10 (shown in FIG. 1). Preformed seal 300 includes a contact surface 302 configured to be at least partially complementary to a discontinuity surface 356, facilitating a seal against fluid flow between first panel 352 and second panel 354 when seal 300 is applied to discontinuity 350. In the embodiment shown in FIGS. 12 and 13, contact surface 302 is defined by a first segment 310 configured to fit against an outer surface 360 of first panel 352, a second segment 312 configured to fit against an outer surface 362 of second panel 354, and a first notch segment 314 and a second notch segment 316 configured to fit into a notch 364 defined between first panel 352 and second panel 354. In the exemplary embodiment, preformed seal 300 also includes a key segment 318 disposed at the end of first notch segment 314 and second notch segment 316. Key segment 318 is configured to facilitate locating seal 300 properly and holding seal 300 in place.

Preformed seal 300 also includes a non-contact surface 304 and a cross-sectional shape 306 defined between contact surface 302 and non-contact surface 304. In the exemplary embodiment, cross-sectional shape 306 is selected to satisfy at least one criterion with respect to seal 300. The at least one criterion may be, for example, a minimum thickness for seal 300 at discontinuity 350. The minimum thickness may be defined based on, for example, a minimum length of first segment 310, a minimum length of second segment 312, or any other suitable measure.

Figure 14:
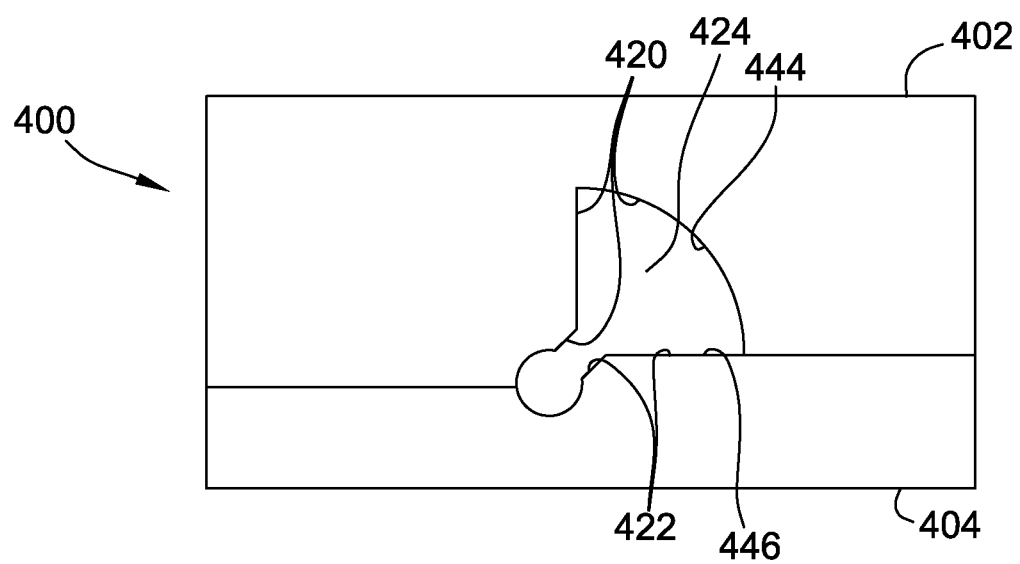
FIG. 14 is a cross-sectional view of an embodiment of a mold configured for making the preformed seal shown in FIGS. 12 and 13.

An exemplary mold 400 for making preformed seal 300 is similar to mold 200 (shown in FIGS. 3-9). A cross-section of exemplary mold 400 is illustrated schematically in a perspective view in FIG. 14. More specifically, a first section 402 of mold 400 includes a first molding surface 420, and a second section 404 includes a second molding surface 422. First molding surface 420 is configured to be complementary to a first portion of the surface of preformed seal 300, and second molding surface 222 is configured to be complementary to a second portion of the surface of preformed seal 300. In particular, first molding surface 420 is complementary to first segment 310, second notch segment 316, and a first portion of key segment 318 of contact surface 302, plus non-contact surface 304. Second molding surface 422 is complementary to second segment 312, first notch segment 314, and a second portion of key segment 318 of contact surface 302. When first section 402 and second section 404 are coupled together, a mold cavity 424 is defined between first molding surface 420 and second molding surface 422 such that a cross-sectional shape of mold cavity 424 corresponds to cross-sectional shape 306 of preformed seal 300.

In certain embodiments, at least one of first molding surface 420 and second molding surface 422 comprises a first portion 444 complementary to non-contact surface 304 of preformed seal 300. Moreover, at least one of first molding surface 420 and second molding surface 422 comprises a second portion 446 complementary to contact surface 302 of preformed seal 300. For example, in the exemplary embodiment shown in FIG. 14, first portion 444 includes the curved portion of first molding surface 420, while second portion 446 includes the remainder of first molding surface 420 and all of second molding surface 422. In certain embodiments, at least a portion of each of first portion 244 and second portion 246 is configured to impart desired properties to non-contact surface 304 and contact surface 302, respectively. In particular, first portion 444 and second portion 446 are configured to impart desired surface roughness characteristics to non-contact surface 304 and contact surface 302, respectively, as described above with respect to mold 200 and preformed seal 100. In alternative embodiments, first molding surface 420 and second molding surface 422 each are configured to impart additional or other desired properties to non-contact surface 304 and contact surface 302.

In the exemplary embodiment, other aspects of mold 400, such as a reservoir and suitable structure for removably coupling first section 402, second section 404, and the reservoir together, are essentially the same as that described for mold 200. In addition, preformed seal 300 may be made from wet sealant using mold 400 in essentially the same fashion as that described for making preformed seal 100 from wet sealant using mold 200.

Figure 15:
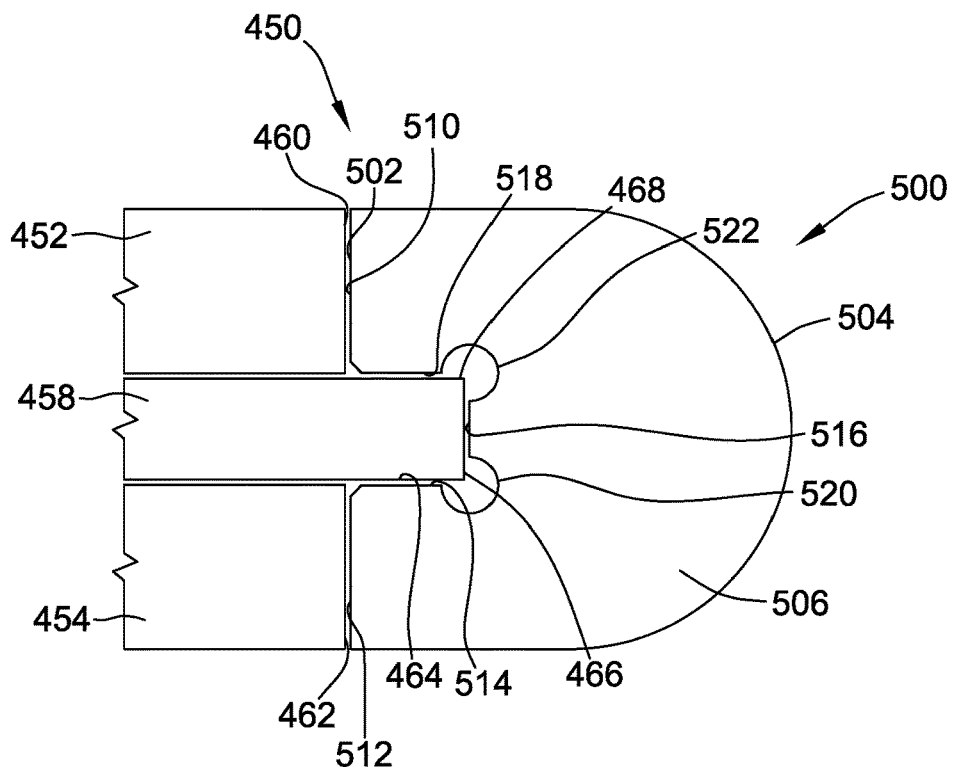
FIG. 15 is a schematic diagram of still another embodiment of a preformed seal applied to still another example structural discontinuity.
Figure 16:
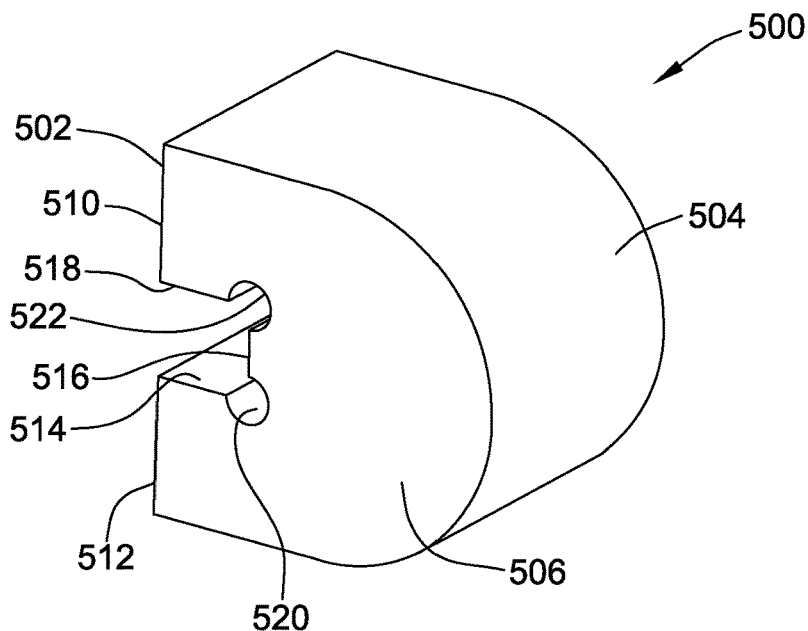
FIG. 16 is a schematic diagram of the preformed seal shown in FIG. 15.

Yet another exemplary embodiment of a preformed seal, designated as preformed seal 500, is illustrated schematically in FIG. 15 and FIG. 16. In the exemplary embodiment, a discontinuity 450 is located where a splice plate 458 is disposed between a first stringer 452 and a second stringer 454. For example, discontinuity 450 may be present in a fuel cell located on a plurality of upper stringers of aircraft 10 (shown in FIG. 1). Preformed seal 500 includes a contact surface 502 configured to be at least partially complementary to a discontinuity surface 456, facilitating a seal against fluid flow between first stringer 452 and splice plate 458, and between splice plate 458 and second stringer 454, when seal 500 is applied to discontinuity 450. In the embodiment shown in FIGS. 15 and 16, contact surface 502 is defined by a first segment 510 configured to fit against an outer surface 460 of first stringer 452, a second segment 512 configured to fit against an outer surface 462 of second stringer 454, a third segment 514 configured to fit against a first outer side surface 464 of splice plate 458, a fourth segment 516 configured to fit against an outer end surface 466 of splice plate 458, and a fifth segment 518 configured to fit against a second outer side surface 468 of splice plate 458. In the exemplary embodiment, contact surface 502 also includes a first fillet 520 to facilitate installation over an edge defined by an intersection of first outer side surface 464 and outer end surface 466, and a second fillet 522 to facilitate installation over an edge defined by an intersection of second outer side surface 468 and outer end surface 466.

Preformed seal 500 also includes a non-contact surface 504 and a cross-sectional shape 506 defined between contact surface 502 and non-contact surface 504. In the exemplary embodiment, cross-sectional shape 506 is selected to satisfy at least one criterion with respect to seal 500. The at least one criterion may be, for example, a minimum thickness for seal 500 at discontinuity 450.

Figure 17:
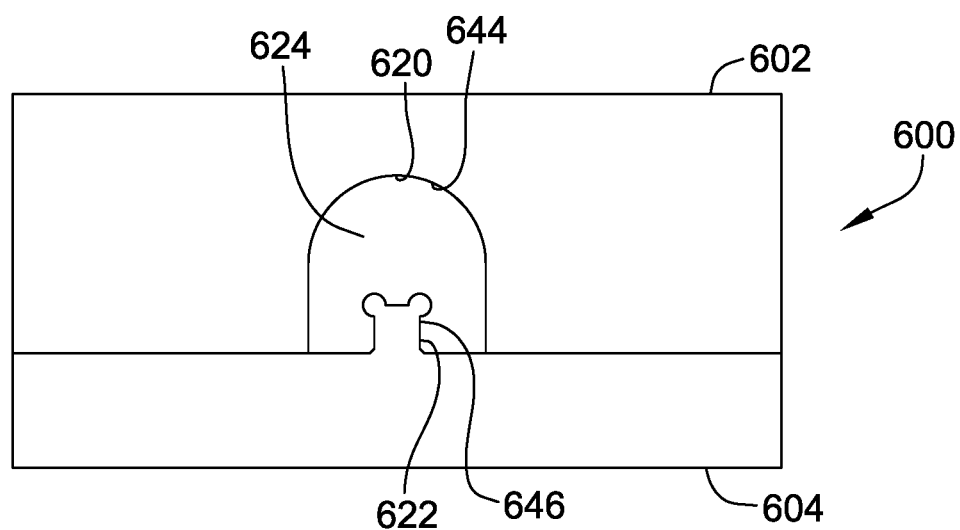
FIG. 17 is a cross-sectional view of an embodiment of a mold configured for making the preformed seal shown in FIGS. 15 and 16.

An exemplary mold 600 for making preformed seal 500 is similar to mold 200 (shown in FIGS. 3-9). A cross-section of exemplary mold 600 is illustrated schematically in a perspective view in FIG. 17. More specifically, a first section 602 of mold 600 includes a first molding surface 620, and a second section 604 includes a second molding surface 622. First molding surface 620 is configured to be complementary to a first portion of the surface of preformed seal 500, and second molding surface 622 is configured to be complementary to a second portion of the surface preformed seal 500. In particular, first molding surface 620 is complementary to a first portion of non-contact surface 504. Second molding surface 622 is complementary to a second portion of non-contact surface 504, first segment 510, second segment 512, third segment 514, fourth segment 516, fifth segment 518, first fillet 520, and second fillet 522. When first section 602 and second section 604 are coupled together, a mold cavity 624 is defined between first molding surface 620 and second molding surface 622 such that a cross-sectional shape of mold cavity 624 corresponds to cross-sectional shape 506 of preformed seal 300.

In certain embodiments, at least one of first molding surface 620 and second molding surface 622 comprises a first portion 644 complementary to non-contact surface 504 of preformed seal 500. Moreover, at least one of first molding surface 620 and second molding surface 622 comprises a second portion 646 complementary to contact surface 502 of preformed seal 500. For example, in the exemplary embodiment shown in FIG. 17, first portion 644 is coextensive with first molding surface 620, and second portion 646 is coextensive with second molding surface 622. In certain embodiments, at least a portion of each of first portion 644 and second portion 646 is configured to impart desired properties to non-contact surface 504 and contact surface 502, respectively. In particular, first portion 644 and second portion 646 are configured to impart desired surface roughness characteristics to non-contact surface 504 and contact surface 502, respectively, as described above with respect to mold 200 and preformed seal 100. In alternative embodiments, first molding surface 620 and second molding surface 622 each are configured to impart additional or other desired properties to non-contact surface 304 and contact surface 302.

In the exemplary embodiment, other aspects of mold 600, such as a reservoir and suitable structure for removably coupling first section 602, second section 604, and the reservoir together, are essentially the same as that described for mold 200. In addition, preformed seal 500 may be made from wet sealant using mold 600 in essentially the same fashion as that described for making preformed seal 100 from wet sealant using mold 200. In certain embodiments, due to first fillet 520 and second fillet 522 partially encapsulating complementary portions of second molding surface 622, cured preformed seal 500 must be flexed and/or slid longitudinally to enable removal from second section 604 after mold 600 is uncoupled.

Figure 18:
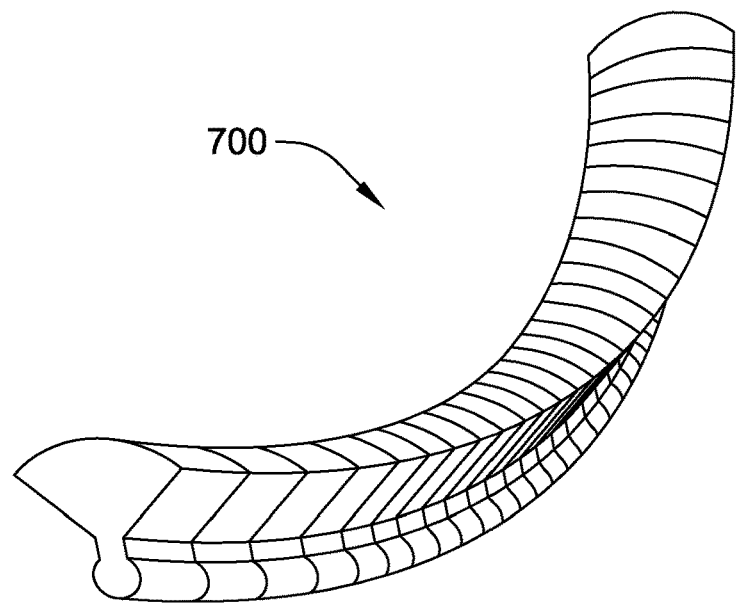
FIG. 18 is a schematic diagram of an embodiment of a nonlinear preformed seal.
Figure 19:
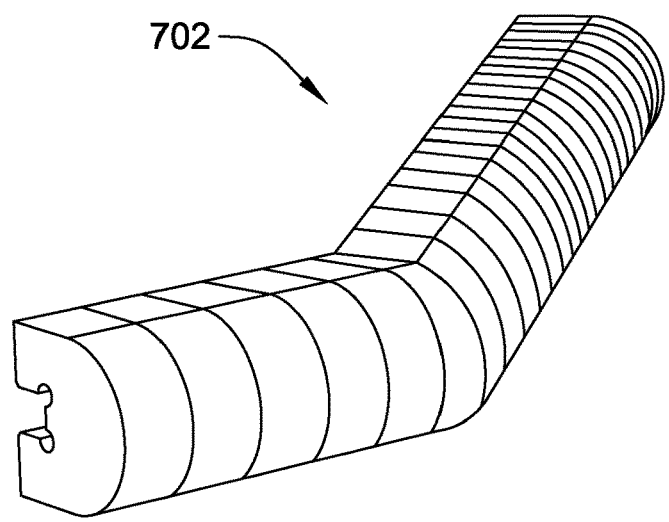
FIG. 19 is a schematic diagram of another embodiment of a nonlinear preformed seal.

Although preformed seals 100, 300, and 500 illustrate three potential cross-sectional shapes for embodiments of preformed seals, it should be understood that in alternative embodiments, preformed seals may have any cross-sectional shape that is suitable for sealing a discontinuity of interest. In addition, alternative embodiments of preformed seals need not be formed in linear pieces such as those illustrated in FIGS. 10 and 11 for preformed seal 100. Suitable embodiments of a mold may be used to make non-linear pieces of preformed seals of any desired cross-section, such as seals 700 and 702 illustrated in FIG. 18 and FIG. 19, respectively. Alternatively, smaller, substantially linear pieces of preformed seal may be spliced together as needed to cover non-linear discontinuities.

Embodiments of preformed seals, such as preformed seal 100, preformed seal 300, and preformed seal 500, may be applied to discontinuities, such as discontinuity 50, discontinuity 350, and discontinuity 450, in any suitable fashion. While examples will be discussed with reference to preformed seal 100 and discontinuity 50 as shown in FIG. 2, FIG. 10, and FIG. 11, it should be understood that the examples are instructive for other embodiments of preformed seals and discontinuities as well. For example, if discontinuity 50 has a length shorter than molded length 116 of preformed seal 100, a piece of preformed seal 100 may be obtained from storage and cut to measure. Alternatively, if discontinuity 50 has a length longer than molded length 116 of preformed seal 100, multiple pieces of preformed seal 100 may be obtained from storage and butt-spliced together during installation to seal discontinuity 50. The consistency in form and shape of preformed seal 100 provided by the use of mold 200 facilitates ease of splicing. Advantageously, pieces of preformed seal 100 may be stored for an essentially unlimited period of time before use on discontinuity 50. In contrast, wet sealant typically has a limited shelf life, such as 40 days, and where wet sealant is to be applied directly to a structure such as aircraft 10, a portion of unused wet sealant typically must be discarded.

In certain embodiments, an adhesive layer (not shown) is pre-applied to contact surface 102 and covered with a protective removable backing (not shown) prior to using or storing preformed seal 100. Thus, certain embodiments permit the installation of preformed seal 100 using a simple "peel and stick" procedure. Additionally or alternatively, immediately prior to installation of preformed seal 100 on discontinuity 50, an adhesion promoter (not shown) may be applied to either or both of contact surface 102 and structural surfaces in the region of discontinuity 50, such as outer surface 60 of first structural member 52, edge surface 62 of second structural member 54, and outer surface 64 of second structural member 54. Preformed seal 100 is then installed on discontinuity 50 and left in place while the adhesion promoter cures.

Figure 20:
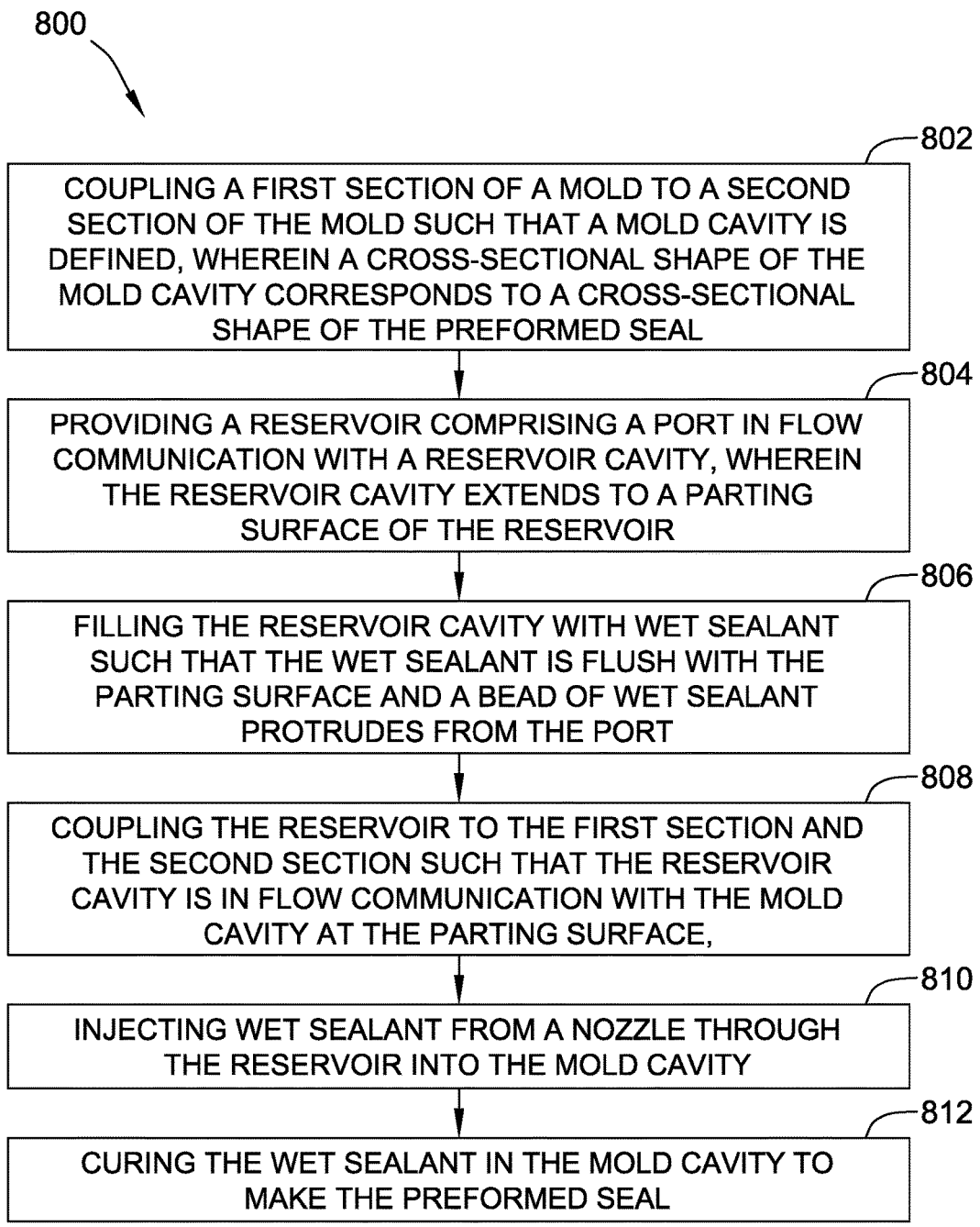
FIG. 20 is a flowchart of an embodiment of a method of making a preformed seal such as the preformed seals shown in FIGS. 2, 13, 16, 18, and 19.

An exemplary method 800 of making a preformed seal, such as preformed seal 100, 300, 500, 700, or 702, using a mold such as mold 200, 400, or 600, is illustrated in FIG. 20. Method 800 includes coupling 802 a first section of a mold, such as first section 202, 402, or 602, to a second section of the mold such as second section 204, 404, or 604, such that a mold cavity, such as mold cavity 224, 424, or 624, is defined, wherein a cross-sectional shape of the mold cavity corresponds to a cross-sectional shape of the preformed seal. Method 800 also includes providing 804 a reservoir, such as reservoir 206, comprising a port in flow communication with a reservoir cavity, wherein the reservoir cavity extends to a parting surface of the reservoir, such as parting surface 236. Method 800 further includes filling 806 the reservoir cavity with wet sealant such that the wet sealant is flush with the parting surface and a bead of wet sealant protrudes from the port, such as port 230. In addition, method 800 includes coupling 808 the reservoir to the first section and the second section such that the reservoir cavity is in flow communication with the mold cavity at the parting surface, injecting 810 wet sealant from a nozzle, such as nozzle 250, through the reservoir into the mold cavity, and curing 812 the wet sealant in the mold cavity to make the preformed seal.

Each of the processes of method 800 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the disclosure may be applied to other industries, such as the automotive industry.

Certain embodiments of a preformed seal, such as preformed seal 100, 300, or 500, made according to embodiments of method 800 using a mold such as mold 200, 400, or 600, present properties that are superior to seals formed by application of wet sealant directly to a discontinuity. For example, excess sealant is applied in 50 to 70 percent of wet sealant applications directly to a structural discontinuity, and insufficient sealant is applied in 15 to 20 percent of such applications. In addition, such applications produce seals with an average of 5 to 7 defects per foot of seal, and about 90 percent of such applications result in a visual appearance rated poor.

In contrast, the use of preformed seals made according to embodiments of method 800 results in 0 percent excess or insufficient sealant, 0 percent poor appearance, and an average of only 3 defects per 100 feet, or 0.03 defects per foot. As, such, preformed seals made according to embodiments of method 800 present properties that are unexpectedly superior relative to at least some known molded or extruded seals. For example, seals having the same cross-sectional shape and size as exemplary preformed seal 100, molded using prior art molds and processes (which tend to trap air within the mold cavity), typically have anywhere from 1 to 50 defects per foot. Seals extruded using prior art extrusion processes typically cannot be made to have the same cross-sectional shape and size as exemplary preformed seal 100, because the wet sealant will not hold its extruded shape.

The embodiments described herein provide a method and apparatus for making preformed seals that meet at least one criterion, such as a minimum thickness at a structural discontinuity to be sealed. The embodiments provide preformed seals with fewer defects and an improved appearance relative to the direct application of wet sealant to a structural discontinuity. Thus, the embodiments reduce or eliminate a need for costly seal rework after installation on the structure. Moreover, the embodiments provide an enhanced ability to control surface properties of the preformed seals, such as a surface roughness on a contact surface to facilitate improved adhesion to the structure. The embodiments yield consistent and uniform seals that meet manufacturing criteria without applying excess sealant, advantageously eliminating unnecessary sealant weight from the structure, such as an aircraft. In addition, the embodiments enable seals to be formed and cured separately from a primary structural manufacturing process, reducing a total required manufacturing time and facilitating enhanced environmental control over the seal forming process. Further, the embodiments include an extrusion from a reservoir into a mold that makes preformed seals with unexpectedly superior properties relative to at least some known molded or extruded seals.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mold for making a preformed seal, said mold comprising:
   a first section;
   a second section configured to be removably coupled to said first section such that a mold cavity is defined between said first section and said second section, wherein a cross-sectional shape of said mold cavity corresponds to a cross-sectional shape of the preformed seal; and
   a reservoir comprising a port in flow communication with a reservoir cavity, wherein said reservoir cavity extends to a parting surface of said reservoir to define an opening in said parting surface, said reservoir is configured to be removably coupled to said first section and said second section such that said reservoir cavity is in flow communication with said mold cavity at said parting surface, wherein when said first section, said second section, and said reservoir are coupled together, said mold is configured to enable wet sealant injected through said port to extrude from said opening into said mold cavity.

2. A mold in accordance with claim 1, wherein said first section comprises a first molding surface that is complementary to a first portion of a surface of the preformed seal, and said second section comprises a second molding surface that is complementary to a second portion of the surface of the preformed seal, said mold cavity is defined between said first molding surface and said second molding surface when said first section and said second section are coupled together.

3. A mold in accordance with claim 2, wherein at least one of said first molding surface and said second molding surface comprises a first portion complementary to a non-contact surface of the preformed seal, said first portion comprises a smooth surface such that the non-contact surface of the preformed seal formed in said mold has a surface roughness of about 63 RMS or lower.

4. A mold in accordance with claim 2, wherein at least one of said first molding surface and said second molding surface comprises a second portion complementary to a contact surface of the preformed seal, said second portion comprises a rough surface such that the contact surface of the preformed seal formed in said mold has a surface roughness in a range of about 125 RMS to about 250 RMS.

5. A mold in accordance with claim 1, wherein said reservoir cavity comprises at least one of a cross-sectional size and a cross-sectional shape configured to facilitate a smooth extrusion of wet sealant therefrom into said mold cavity.

6. A mold in accordance with claim 5, wherein said reservoir cavity is defined by a plurality of surfaces, at least one pair of surfaces of the plurality of surfaces meets at an obtuse angle.

7. A mold in accordance with claim 5, wherein a cross-sectional area of said reservoir cavity is substantially constant between said port and said parting surface.

8. A mold in accordance with claim 1, wherein said first section and said second section each comprise an interface end, said reservoir parting surface is adjacent to said interface end when said first section, said second section, and said reservoir are coupled together.

9. A mold in accordance with claim 8, wherein said first section and said second section each comprise a second end opposite said interface end, said mold cavity extends through said interface end, along a length of said first section and said second section, and through said second end.

10. A mold in accordance with claim 2, wherein said first molding surface and said second molding surface are coated with a release agent.

11. A mold in accordance with claim 1, wherein said first section and said second section each comprise at least one cooperating bolt hole sized to receive a bolt therethrough for removably coupling said first section and said second section together.

12. A mold in accordance with claim 6, wherein no pair of surfaces of the plurality of surfaces meets at an acute angle.

13. A mold in accordance with claim 1, wherein said reservoir comprises at least one bolt hole configured to cooperate with corresponding bolt holes in said first section and said second section.

14. A mold in accordance with claim 10, wherein the release agent is a dry lubricant.

15. A mold in accordance with claim 10, wherein the release agent is a layer of tape.

16. A mold in accordance with claim 1, wherein said first section and said second section are configured to make a non-linear piece of the preformed seal.

* * * * *